United States Patent

[11] 3,615,560

[72] Inventors Hendrik Jonker;
Theodorus Petrus Gerardus Wilhelm Thijssens, both of Emmasingel, Eindhoven, Netherlands

[21] Appl. No. 781,688

[22] Filed Nov. 18, 1968

[45] Patented Oct. 26, 1971

[73] Assignee U. S. Philips Corporation New York, N.Y.
Continuation of application Ser. No. 441,906, Mar. 22, 1965.

[54] METHODS OF MANUFACTURING PHOTOSENSITIVE MATERIALS
4 Claims, No Drawings

[52] U.S. Cl. .......... 96/87, 96/49

[51] Int. Cl. .......... G03c 1/78

[50] Field of Search .......... 96/49, 85 X, 87, 75

[56] References Cited

UNITED STATES PATENTS

| | | | |
|---|---|---|---|
| 2,735,773 | 2/1956 | Dippel et al. | 96/49 |
| 2,609,295 | 9/1952 | Alink et al. | 96/49 |
| 2,698,235 | 12/1954 | Swindells | 96/85 X |
| 2,794,742 | 8/1955 | Fowler et al. | 96/87 |
| 2,838,398 | 6/1958 | Dippel et al. | 96/49 |
| 3,035,916 | 5/1962 | Heiart | 96/87 |
| 3,178,378 | 4/1965 | Winchell | 97/87 X |

*Primary Examiner*—Norman G. Torchin
*Assistant Examiner*—Edward C. Kimlin
*Attorney*—Frank R. Trifari

ABSTRACT: Provide a noncrystalline photosensitive layer on a nonsaponifiable nonwater-impregnable base. Between the base and photosensitive film there is sandwiched an adhesive containing an elastomer.

METHODS OF MANUFACTURING PHOTOSENSITIVE MATERIALS

This a continuation of application Ser. No. 441,906, filed Mar. 22, 1965, and now abandoned.

This invention relates to a method of manufacturing a photosensitive element and to the photosensitive element thus obtained.

The present photosensitive element comprises a base, at least the surfaces of which are electrically nonconductive on which an aqueous solution of a photosensitive compound is provided, which compound when exposed to light yields a reaction product which when brought in contact with a member selected from the group consisting of silver- and mercurous compounds and mixtures thereof and moisture produces a physically developable nuclei image consisting of a metal selected from the group consisting of silver and mercury and mixtures thereof.

As carriers for the known photosensitive system, so far there have been used at least superficially hydrophilic materials, for example foils of superficially saponified cellulose esters or foils of nonsaponifiable material on which a thin layer of a saponifiable lacquer is provided which latter layer is preferably uniformly and completely saponified.

Under such circumstances the depth of the hydrophilic layer determines for a large extend the depth of the photosensitive layer. Also the degree of adhesion of a physically developed metal pattern to the nonconductive base depends, in such circumstances, among other things on the depth of the photosensitive layer and therefore on the depth of the hydrophilic layer.

However, for many purposes, the adhesion to the base of the resultant metal pattern is either too strong or too weak. For example, for the manufacture of strippable metal patterns, the adherence of the pattern to the basic layer in general is too strong locally, so that stripping, in particular, of very fine patterns, often results in damage thereto. For the manufacture of printed wiring, on the contrary, it is usually not good enough. As far as the adherence is concerned, a great possibility of variation is required, namely from extremely well adhering to easily removable from the basic layer.

In addition, it must be considered as a great drawback that many materials having excellent electrically insulating properties, for example polyethylene terephtalate, polyethylene and polytetrafluoroethylene can be used with the known methods only after providing a saponifiable lacquer on the surface of these materials. This lacquer layer must then be saponified as a result of which the resultant surface becomes strongly sensitive to moisture with all the disadvantages resulting therefrom.

A principal object therefore of our invention is to provide a photosensitive layer upon a nonsaponified water nonimpregnable base.

Another principal object of our invention is to provide an improved method for controlling the adherence of a photographically produced metal pattern to a nonmetallic base.

These and other objects of our invention will be apparent from the description that follows:

According to one aspect of our invention, we provide a photosensitive layer on a water-nonimpregnable base by coating the base with an aqueous solution of a photosensitive compound, and if desired a wetting agent and/or a crystallization inhibitor to prevent crystal formation upon drying of the solution and then causing the photosensitive solution to dry up on the nonmetallic base thus leaving a photosensitive noncrystalline film adhering to said base.

According to a further aspect of the invention, the water nonimpregnable base is superficially provided with an adhesive which may or may not be thermohardening prior to the application of the photosensitive solution.

The invention provided the possibility of using substantially any material which has electrically interesting properties as a basic layer, while in addition, it provides an extensive range of possibilities with respect to the adherence.

Water nonimpregnable basic layers which can be used within the scope of our invention may consist, for example, of glass, unsaponified cellulose esters, paper impregnated with synthetic resins, polymethylmetacrylate, polyethyleneterephtalate, polystyrene and silicone rubber. It is of importance that the surface of the basic layer is fully wetted by the solution of the photosensitive compound, the so-called sensitizing solution, and that after drying up of the sensitizing solution an even vitreous photosensitive layer remains on the basic layer. As a rule, a sufficient wetting of the basic layer can be obtained by suitable choice of the concentration of the wetting agent added to the sensitizing solution. The surface of some materials, for example polyethylene, polytetrafluoroethylene and paraffine, must be made somewhat polar beforehand. For such surface treatments, various methods are known from the literature, see, for example, T. Tsumoda et al. in Bulletin of the Chemical Society of Japan, 35, page 1,570 (1962): "Effect of sulfuric acid and chromic acid mixture treatment of plastics on their wettability towards water" and A. Benderley in Journal of Applied Polymer Science 6, page 221 (1962): "Treatment of Teflon to promote bondability". In some cases, the addition of a wetting agent is alone sufficient to inhibit the drying up in a crystalline form of the photosensitive layer. If required, however, other substances may be added to the sensitizing solution which inhibit and the crystallization because they themselves hardly crystallize, if at all, for example, dextrine, sorbitol, calcium lactate and lactic acid. The latter two substances may also serve as pH-buffers.

Naturally, care should be taken that no wetting agents or other additives to the photosensitive solution are used which might cause undesired reactions, for example, by forming insoluble salts with the photosensitive compound or by forming afterwards metal nuclei in the nuclei forming bath itself. Thus the nonionic wetting agents are particularly useful for this invention. It will further be clear that the basic layer itself, at least at its surface, on which the photosensitive solution is applied, may contain no reducing or disproportionating molecules or groups of such an activity and in such a concentration that as a result thereof, a conductive fog occurs during the physical development.

For the conversion of the light-reaction product into the laten metal nuclei image, the exposed material is contacted with an aqueous solution of mercurous salt or of a silver salt or of a solution which contains both (the nuclei-forming bath). In this case the vetreous layer which contains the light reaction product rapidly dissolves so that the nuclei formation takes place in a liquid film in which convection and diffusion have free play. It therefore is particularly surprising that nevertheless, a sufficient number of nuclei deposits on the surface of the basic layer and remains there in the correct position, so that after physical development, good images can be obtained without a conductive fog.

The photographic qualities of the material, such as the sensitivity of the photosensitive layer and the definition of the resulting images are largely determined by the thickness and the composition of the photosensitive layer and by the concentration of the metal salt in the nuclei forming bath.

In view of the convection and diffusion phenomena occurring during the nuclei formation, the thickness of the photosensitive layer will be chosen to be as small as possible since in that case the possibility is minimized that the nuclei not formed in the immediate proximity of the basic layer are lost for the ultimate image formation by displacement, and the danger is the smallest that by deposition of displaced nuclei on part of the surface of the basic layer located outside the pattern, formation of fog occurs. However, as the thickness of the photosensitive layer is decreased, the quantity of the photosensitive substance present in the layer also becomes smaller and therefore the extinction coefficient of the layer with respect to actinic light is also decreased which affects the resulting photographic sensitivity of the layer. By ensuring that the auxiliary substances which are present in addition to the actual photosensitive substance, are restricted to the required number and quantity, it is nevertheless possible to obtain good thin photosensitive layers having a sensitivity which is acceptable in every way. In the scope of the invention, photosensitive layers have been manufactured, for example, having a thickness of only 0.4 micron and an extinction coefficient of 0.3 which means that these layers absorb 50 percent of the impinging light.

Of course it is possible, by using thicker layers, to increase the extinction coefficient and consequently the photographic sensitivity somewhat. Since, however, in the normal manner of exposure to light the average distance from the light reaction product formed in the layer to the surface of the basic layer is increased as the thickness of the photosensitive layer is chosen to be larger, an ever increasing part of the formed nuclei will not correctly take part in the formation of the ultimate image.

The latter difficulties may be avoided by another aspect of our invention. According to this aspect of our invention, a thin transparent base is employed, the photosensitive solution is applied and the photosensitive layer is exposed from the side facing the base, i.e., through the base itself.

In this manner, an increased extinction coefficient may be used to full advantage since the light reaction product is then formed predominantly in the immediate proximity of the surface of the basic layer while in addition the advantage results that direct contact of the vulnerable vitreous photosensitive layer with the negative is prevented.

The concentration of the metal salt in the nuclei forming bath must be matched to the composition and the thickness of the photosensitive layer. For very thin layers, said concentration may be down to $10^{14}$mol, for thicker layers, the minimum limit lies higher, at approximately $10^{12}$ mol, while a concentration of even 1 mol is still usable.

A particularly suitable class of photosensitive compounds for the use of the present method is that of the aromatic diazosulfonates which are preferably used in combination with a so-called antiregression agent, that is to say, a compound which when added to the photosensitive layer prevents the reformation of the diazosulfonate from its light reaction products by binding either the sulfite or the diazosulfonate form its light reaction products by binding either the sulfite or the diazonium ion, or both in a manner such that the sulfite maintains the possibility of reacting with the mercurous compound while forming mercury nuclei. The use of photosensitive compounds of this class is favorable in view of the definition of the metal patterns obtained therewith.

Among the suitable photosensitive compounds that may be employed are those disclosed in U.S. States Pat. Nos. 2,735,773 and 2,738,272.

According to a further elaboration of the method according to the invention, the basic layer consists at least superficially of a type of adhesive which contains at least one thermohardening elastomeric component. Preferably for this purpose, mixtures of rubberlike (elastomeric) types of adhesive, for example on the basis of butadiene acrylonitrile, are used which contain a thermohardening component which is only partially hardened. A great variety of types of adhesive to be considered are described in I. Skeist, Handbook of Adhesives, chapters 14–22, New York 1962.

Dependent upon the thickness of the layer of adhesive, this embodiment provides metal images which vary from being easily strippable to adhering very tightly to the surface of the basic layer.

By heating, after the manufacture of the ultimate metal patten, full hardening of the adhesive on said basic layer takes place and the adherence of the metal pattern is usually enhanced.

As is known, metal nuclei located on the surface of a carrier can be intensified only very slowly on physical development by means of a developer which contains an ionic surface active substance as stabilizer, because the surface active molecules form micelles on the metal nuclei with their polar parts which protect the nucleus from the metal ion and the reduction agent. It consequently is recommended to effect the intensification by physical development of the metal nuclei at least initially by means of a nonstabilized developer.

However, the intensification by means of a stabilized physical developer has advantages from an economical point of view and as a rule results in images which when viewed electromicroscopically show fewer pores than those obtained by means of a nonstabilized physical development. It therefore is recommended to subject the nuclei images only to a slight initial development by means of a nonstabilized developer and to develop them further by means of a stabilized developer until the desired quantity of image metal has deposited.

Instead of formation of noble metal images by physical development, after activation to copper, nickel or cobalt images by means of a solution of one or more slats of these metals in a reduction agent for that salt.

Finally, electrically conductive metal images may be further intensified in known manner by electrodeposition or electrophoretically.

In order that our invention may readily be carried into effect, it will now be described in greater detail with reference to the following specific examples:

I

Paper was impregnated with a cresol formaldehyde resin and then wetted with a solution containing per litre:

0.05 mol of magnesium salt of 0-methoxybenzenediazosulfonic acid
0.017 mol of calcium lactate
0.017 mol of cadmium lactate
0.017 mol of lactic acid
10 gram of "Lissapol N"

and was dried in a suspended position at room temperature. "Lissapol N" is a nonionic surface active substance consisting of a 27 percent by weight solution in water of a nonyl phenol ethylene oxide condensate.

The paper which was rendered photosensitive in this manner was exposed behind a negative of a wiring pattern for 30 seconds at a distance of 30 cm from a 125 WHPR-lamp, a special mercury vapor discharge tube for reproductive purposes marketed by the applicant.

The nuclei image was formed by applying to the exposed paper a solution containing per litre:

0.05 mol of mercurous nitrate
0.01 mol of silver nitrate
0.1 mol of nitric acid

After rinsing in distilled water the nuclei image was developed at 20 ° C. for 2 minutes in a solution which contained per litre:

0.05 mol of metol
0.1 mol of citric acid
0.05 mol of silver nitrate

Then the image was rinsed in distilled water for 2 minutes and treated with 1 n. sulfuric acid for 1 minute. After copper plating by electrodeposition the pattern was packed up under pressure while heating with a number of other patterns manufactured in a similar manner.

Instead of employing impregnated paper, conductive images may be made with a similar result on basic layers of, for example polystyrene, silicone rubber and polymethylmethacrylate.

II

Paper was dipped in molten paraffin and the basic layer obtained after cooling which consequently consisted of paraffin at its surface, was contacted, to obtain a somewhat polar surface, for 5 seconds at 20° C. with a solution consisting of:

150 parts by weight of concentrated sulfuric acid ($d$=1.84)
12 parts by weight of distilled water
7.5 parts by weight of potassium bichromate, sprayed with water and dried.

In the manner as described in example I a photosensitive layer is applied on the basic layer. The exposure to light behind a negative was carried out for 1 minute at a distance of 30 cm. from a 125 WHPR-lamp. The nuclei formation and the physical development were carried out as described in example I. An electrically conductive silver image was obtained having a surface resistance of 1 ohm per square.

A similar result was obtained when polyethylene was chosen as the basic layer.

III

A film of polyethylene teraphtalate was drawn from a solution of methyl isobutyl ketone which contains 60 percent by weight of an adhesive (N178) marketed by Armstrong Cork Company on the basis of a butadiene acrylonitrile copolymer. After drying at room temperature for 48 hours after which period a layer of adhesive, approximately 10 microns thick, remained, a photosensitive layer was applied to the resulting basic layer by suffusing it with a solution containing per litre:

0.1 mol of the sodium salt of 2-chloro, 5-methoxybenzene diazosulfonic acid
10 g. of sorbitol
10 g. of Invadine JFC; a nonionic surface active substance marketed by CIBA.

After draining the excess of photosensitive solution and drying up of the remaining layer, it was exposed for 1 minute behind a negative of a wiring pattern at a distance of 30 cm. from a 125 WHPR-lamp. The nuclei image was formed by means of a solution containing per litre:

0.005 mol of mercurous nitrate
0.01 mol of silver nitrate
0.01 mol of nitric acid The resulting nuclei image was intensified for 1 minute by means of the physical developer of example I and then copper plated by electro deposition to a thickness of 20 microns.

The adherence of the resulting copper image was determined by soldering a wire on joints of 3 mm. diameter at 250° C. and then determining the force necessary for detaching the joint at right angles from the basic material. In this example the detaching force determined in this manner varied from 1,500 to 2,000 g.

By providing also on the rear side of the basic material a photosensitive layer and by exposing it to light for 1½ minutes, a flexible printed wiring pattern is obtained in the above-described manner which shows the same conductive pattern on both sides. Similar results are obtained when the layer of adhesive is provided on foils of, for example, polystyrene, cellulosetriacetate, polycarbonate and polyimide.

IV

A film of polyethylene terephtalate was provided with a layer of adhesive of approximately 0.5 micron by drawing it from a solution in methyl isobutylketone of 5 percent by weight of the type of adhesive which is marketed by the 3 M Company under the Trade Mark EC 776 then allowing the film to drain and dry in air for ±2 hours.

The resulting basic layer was rendered photosensitive in the manner described in example I. The photosensitive layer was found to have an extinction on measurement of 0.3 at a thickness of 0.35 micron. Exposure to light was carried out by means of a 125 WHPR-lamp at a distance of 30 cm. for 30 seconds behind a negative of a grating with lines of 25 microns wide.

The nuclei formation took place in a solution containing per litre:

0.25 mol of mercurous nitrate
0.01 mol of silver nitrate
0.01 mol of nitric acid The physical development took place for 90 seconds in the developer described in example I. The resulting conductive silver image was then nickel plated until 10 microns thick by electrodeposition and could then readily be detached from the basic layer.

(Adhesive EC 776 contains a copolymer of butadiene acrylonitrile).

The basic layer of example III was rendered photosensitive in the manner described in example I.

After exposure to light for 20 seconds at a distance of 30 cm. from a 125 WHPR-lamp a nuclei image was formed in a solution containing per litre:

0.05 mol of mercurous nitrate
0.01 mol of silver nitrate and
0.1 mol of nitric acid.

After rinsing with distilled water, a part of the material was developed for 5 minutes in a solution containing per litre:

0.0125 mol of metol
0.01 mol of silver nitrate
0.01 mol of citric acid rinsed in water and dried. The image thus subjected to an initial development which showed not yet any measurable conductivity was further intensified for 1 minute in a stabilized developer containing per litre:

0.2 mol of ferrous-ammonium sulfate
0.08 mol of ferric nitrate
0.1 mol of citric acid
0.1 mol of silver nitrate
0.02 percent by weight of "Armac" 12 D
0.02 percent by weight of "Lissapol N".

"Armac" 12 D mainly consists of dodecylamine acetate in addition to acetates of amines of lower and higher fatty acids.

After rinsing with distilled water and then treating for 1 minute with 1 n sulfuric acid the resulting image shows a surface resistance of 1 ohm per square.

The rest of the material containing the nuclei image was immediately transferred into the above stabilized developer without preceding initial development in a nonstabilized developer. After 30 minutes no electric conductivity could be observed on the material thus treated.

A layer of adhesive was provided on a glass plate in the manner described in example III. The sensitization, the exposure, the nuclei formation, the physical development and the electro deposition were entirely performed in the manner as described in example I.

The detaching force as described in example III on a 3 mm circular joint was 500 to 1,000 g. When the layer of adhesive was heated for 1 hour at 145° C. to harden, the detaching force was found to be 4,000 to 5,000 g.

The layer of adhesive may alternatively be provided on metallic aluminum instead of on glass with the same results.

VII

The basic layer of example III was sensitized by treatment with a solution containing per litre:

0.035 mol of the sodium salt of 2, 7-anthraquinone disulfonic acid
0.1 mol of calcium lactate
0.25 mol of lactic acid
10 g of "Lissapol N".

The excess of solution was allowed to drain from the layer and then the solution was dried in air. The photosensitive material was exposed to light for 30 seconds behind a negative at a distance of 60 cm. from a 125 WHPR-lamp. The silver nuclei image was formed by contacting the exposed material with a solution containing 0.2 mol acetic acid and 0.01mol silver nitrate and to which NaOH had been added until pH.6. The nuclei image was physically developed for 90 seconds in the solution of example I and further copper plated by electrodeposition.

A flexible printed wiring pattern was obtained, which, as far as the adherence is concerned, was of the same quality as that obtained by example III.

VIII

THe basic layer of example III was sensitized in the manner described in example I. The photosensitive material was exposed for 20 seconds behind a negative at a distance of 40 cm. from a 125 WHPR-lamp.

The nuclei image was also formed in the manner described in example I and was subjected to initial development for 2 minutes by means of a solution containing per litre:

0.05 mol ferrous-ammonium sulfate
0.01 mol ferric nitrate
0.1mol citric acid and 0.01 mol silver nitrate Then it was rinsed for 2 minutes with distilled water. The resulting silver image has a surface resistance of 1,000 to 10,000 ohm per square. Then it was copper plated by nonelectrolytic deposition for 3 minutes at 35° C. in a solution containing per litre:

0.14 mol of copper sulfate
0.2 mol of triethanolamine
0.65 mol of sodium hydroxide
160 ml. of 40 percent formaldehyde-solution The resulting conductive copper image had a surface resistance of 0.1 ohm per square.

While we have described our invention in connection with specific embodiments and applications, other modifications thereof will be readily apparent to those skilled in this art without departing from the spirit and scope of the invention as defined in the appended claims.

What we claim is:

1. A photosensitive element comprising a base, at least the surfaces of which are electrically nonconductive and water nonimpregnable, a light sensitive layer containing a photosensitive compound which when exposed to light yields a reaction product which when brought in contact with a member selected from the group consisting of silver and mercurous compounds and mixtures thereof and moisture produces a physically developable nuclei image consisting of a metal selected from the group containing of silver and mercury and mixtures thereof and a wetting agent or a crystallization inhibitor, and a thermohardened elastomer containing adhesive substrate in contact with said light sensitive layer and a surface of said base.

2. The photosensitive element of claim 1 wherein the photosensitive compound is a diazosulfonate.

3. The photosensitive element of claim 1 wherein the base is transparent to light.

4. The photosensitive element of claim 3 wherein both surfaces of the base are in contact with the adhesive substrate and the light sensitive layer.

PO-1050
(5/69)

UNITED STATES PATENT OFFICE
CERTIFICATE OF CORRECTION

Patent No. 3,615,560 (PHN 160A) Dated October 26, 1971

Inventor(s) HENDRIK JONKER ET AL

It is certified that error appears in the above-identified patent and that said Letters Patent are hereby corrected as shown below:

In Column 1, before the title of the invention, insert -- Foreign Application Priority Date - March 21, 1964 - Netherlands - 6,403,056 --.

Signed and sealed this 13th day of June 1972.

(SEAL)
Attest:

EDWARD M.FLETCHER, JR.
Attesting Officer

ROBERT GOTTSCHALK
Commissioner of Patents